(12) United States Patent
Kawakami et al.

(10) Patent No.: US 9,199,661 B2
(45) Date of Patent: Dec. 1, 2015

(54) STEERING DEVICE

(71) Applicant: YAMADA MANUFACTURING CO., LTD, Kiryu-shi (JP)

(72) Inventors: Takahiro Kawakami, Kiryu (JP); Kazunari Machida, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 14/466,787

(22) Filed: Aug. 22, 2014

(65) Prior Publication Data

US 2015/0059512 A1 Mar. 5, 2015

(30) Foreign Application Priority Data

Sep. 3, 2013 (JP) ................................. 2013-182331

(51) Int. Cl.
*B62D 1/184* (2006.01)
*B62D 1/185* (2006.01)
*B62D 1/187* (2006.01)

(52) U.S. Cl.
CPC ................ *B62D 1/184* (2013.01); *B62D 1/185* (2013.01); *B62D 1/187* (2013.01)

(58) Field of Classification Search
CPC ......... B62D 1/184; B62D 1/185; B62D 1/187
USPC .......................................................... 74/493
See application file for complete search history.

(56) References Cited

U.S. PATENT DOCUMENTS

| | | | |
|---|---|---|---|
| 6,467,807 B2* | 10/2002 | Ikeda et al. .................... | 280/775 |
| 6,990,874 B2* | 1/2006 | Murakami et al. .............. | 74/493 |
| 2008/0252056 A1* | 10/2008 | Moriyama et al. ............ | 280/775 |
| 2010/0000366 A1* | 1/2010 | Nomura et al. ................. | 74/493 |
| 2010/0242663 A1* | 9/2010 | Takezawa et al. .............. | 74/493 |
| 2010/0294072 A1* | 11/2010 | Ishii et al. ........................ | 74/493 |
| 2012/0198956 A1* | 8/2012 | Takezawa et al. .............. | 74/493 |
| 2013/0263686 A1* | 10/2013 | Osawa et al. ................... | 74/495 |
| 2014/0331811 A1* | 11/2014 | Fujiwara et al. ................ | 74/493 |

FOREIGN PATENT DOCUMENTS

| | | |
|---|---|---|
| JP | 2008-239049 A | 10/2008 |
| JP | 2010-254290 A | 11/2010 |
| JP | 2011-006056 A | 1/2011 |

OTHER PUBLICATIONS

Japanese Office Action dated Aug. 11, 2015.

* cited by examiner

*Primary Examiner* — Paul N Dickson
*Assistant Examiner* — Darlene P Condra
(74) *Attorney, Agent, or Firm* — McGinn IP Law Group, PLLC

(57) ABSTRACT

A steering device includes: a fixing bracket; an outer column A including a gripping main body portion which is installed swingably on the fixing bracket and which grips an inner pipe, a slit portion formed along the gripping main body portion, clamping portions formed along an axial direction of slit edges which are mutually opposing in the width direction of the slit portion, and a coupling portion which couples together the two clamping portions; and a clamping tool which expands and contracts an interval between the two coupling portions of the outer column A. The coupling portion projects to the outer side of a forming region of the slit portion.

2 Claims, 8 Drawing Sheets

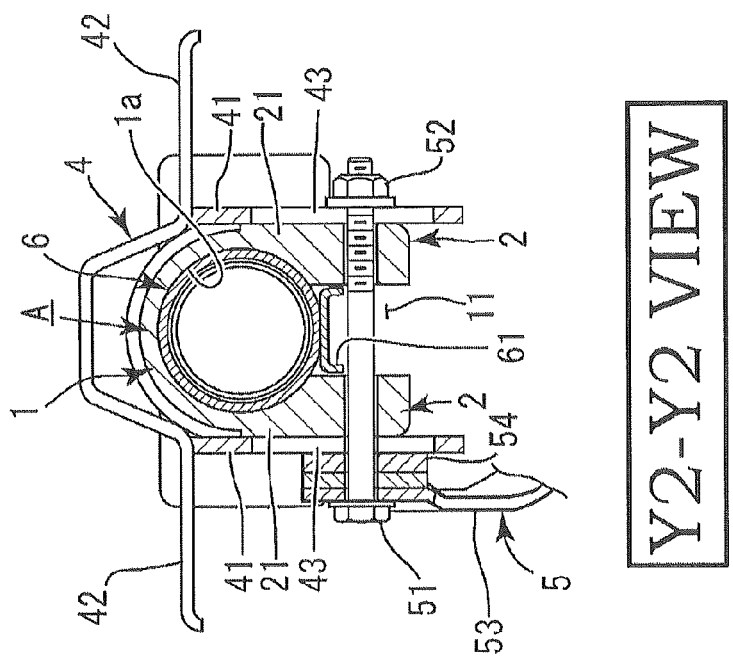
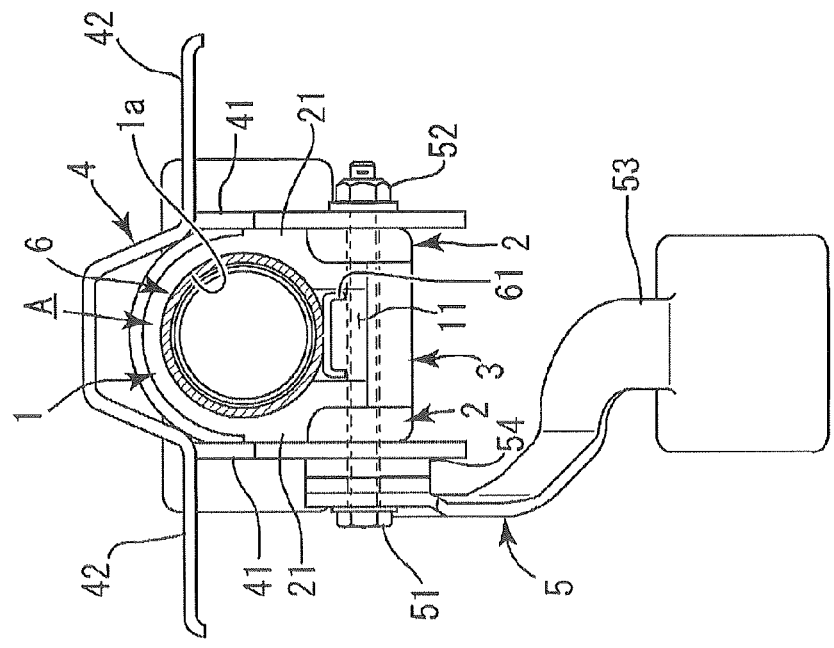

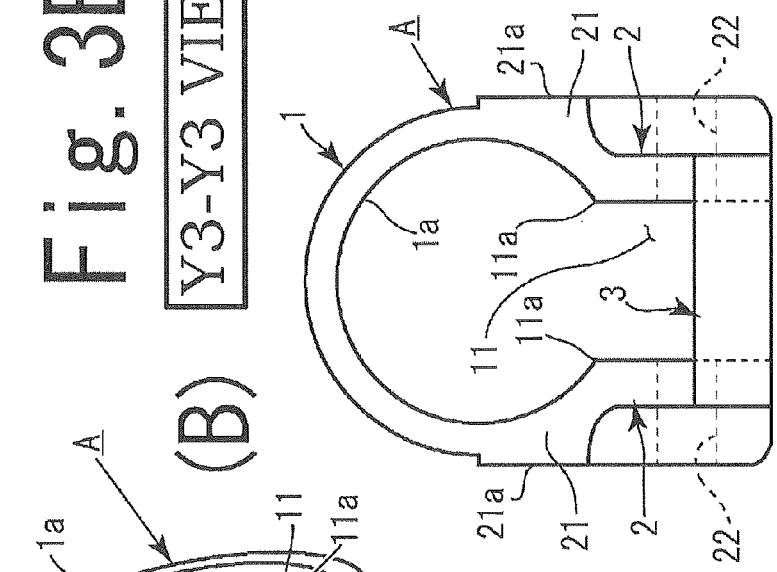
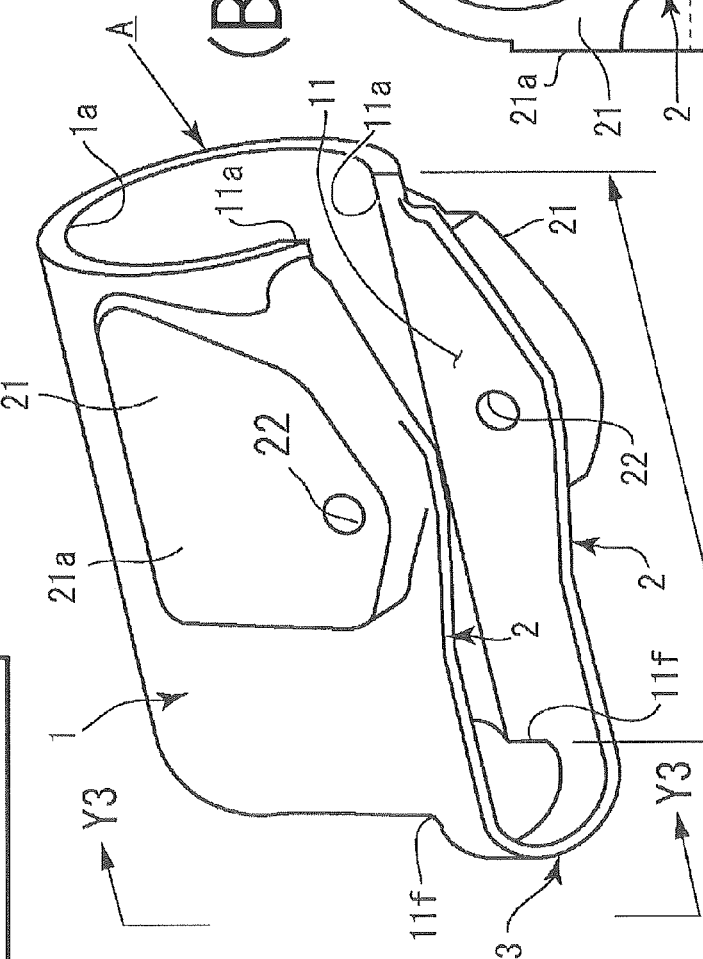

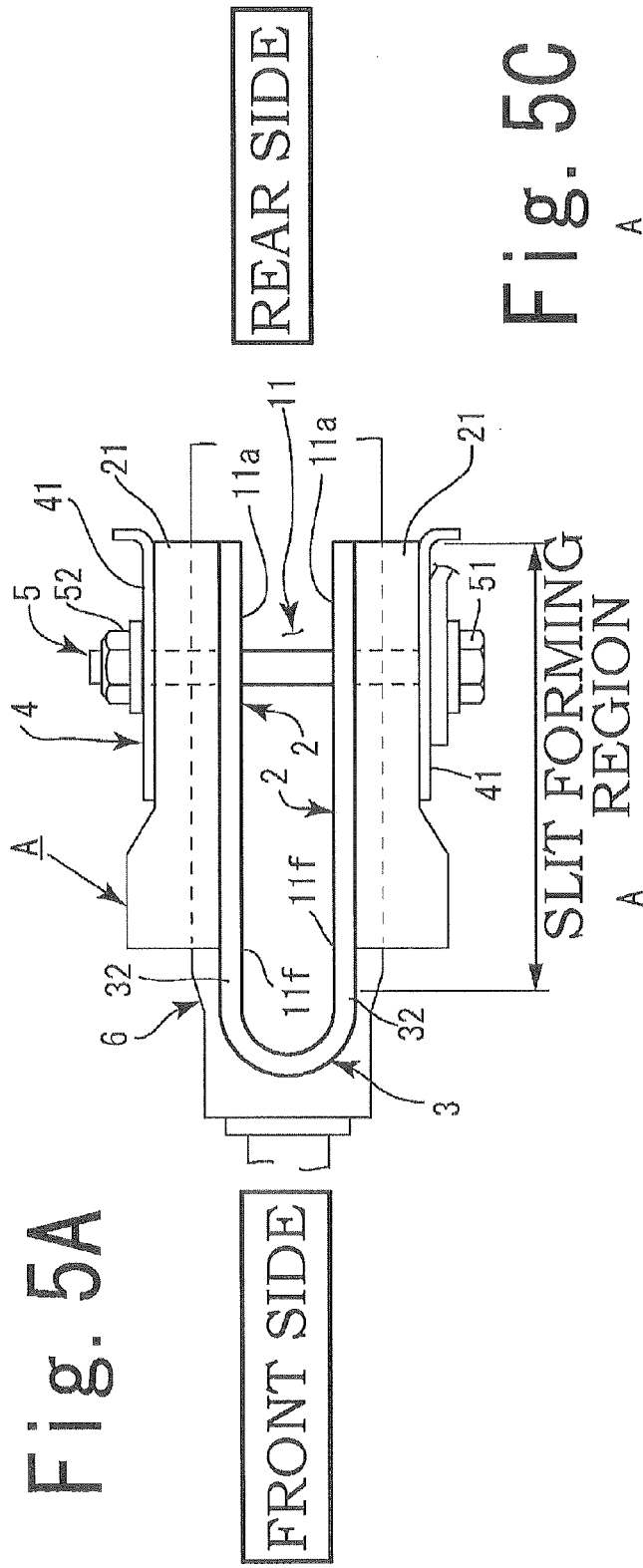
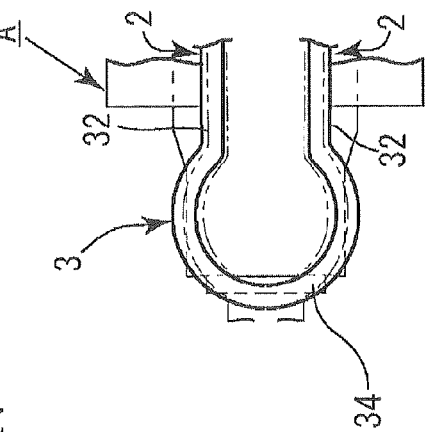
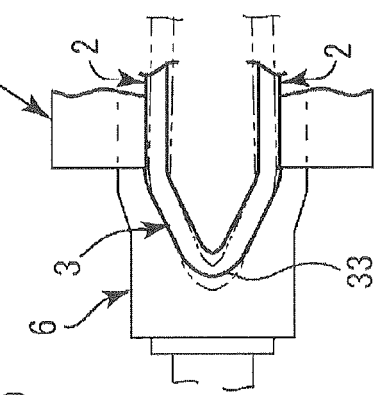

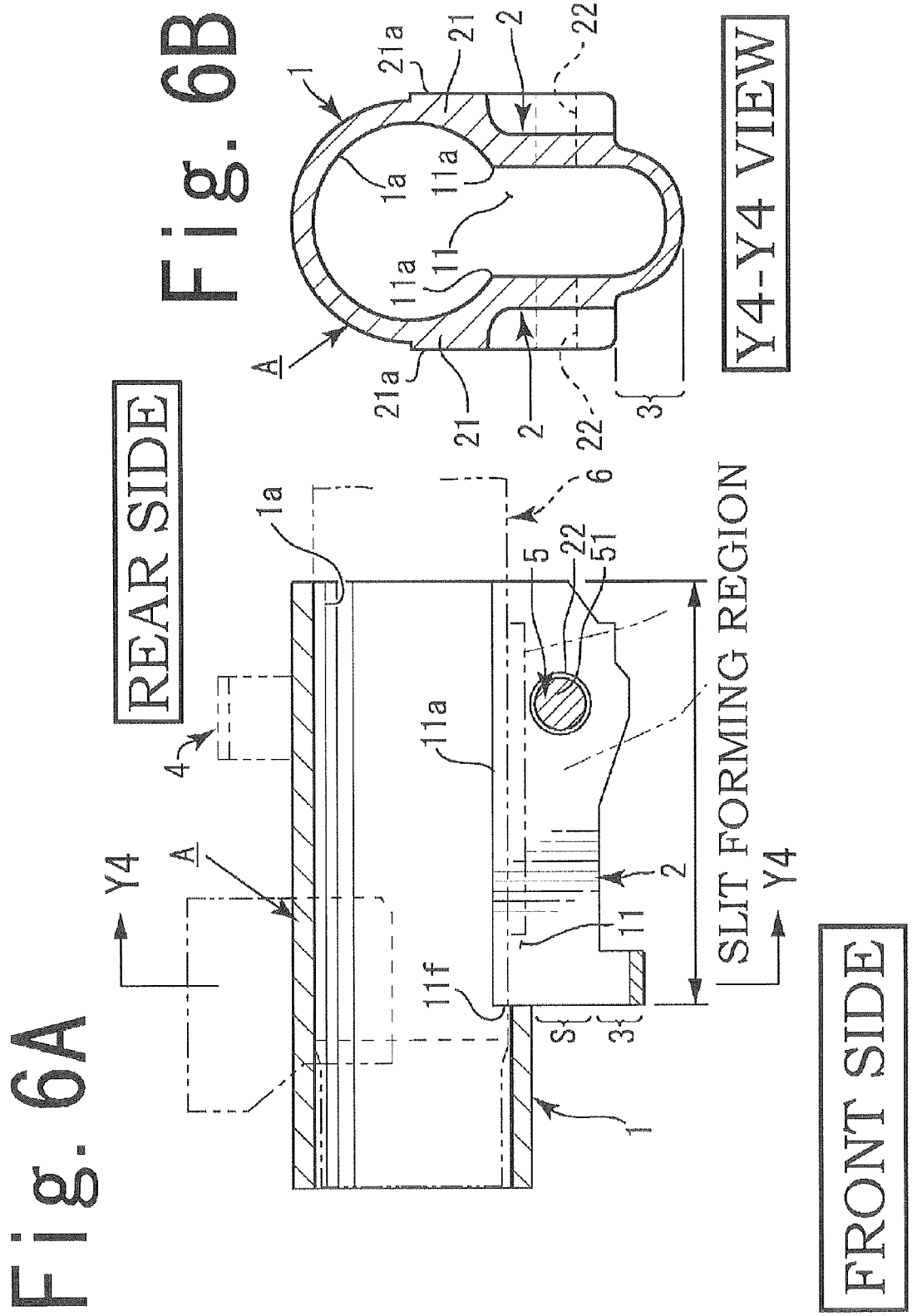

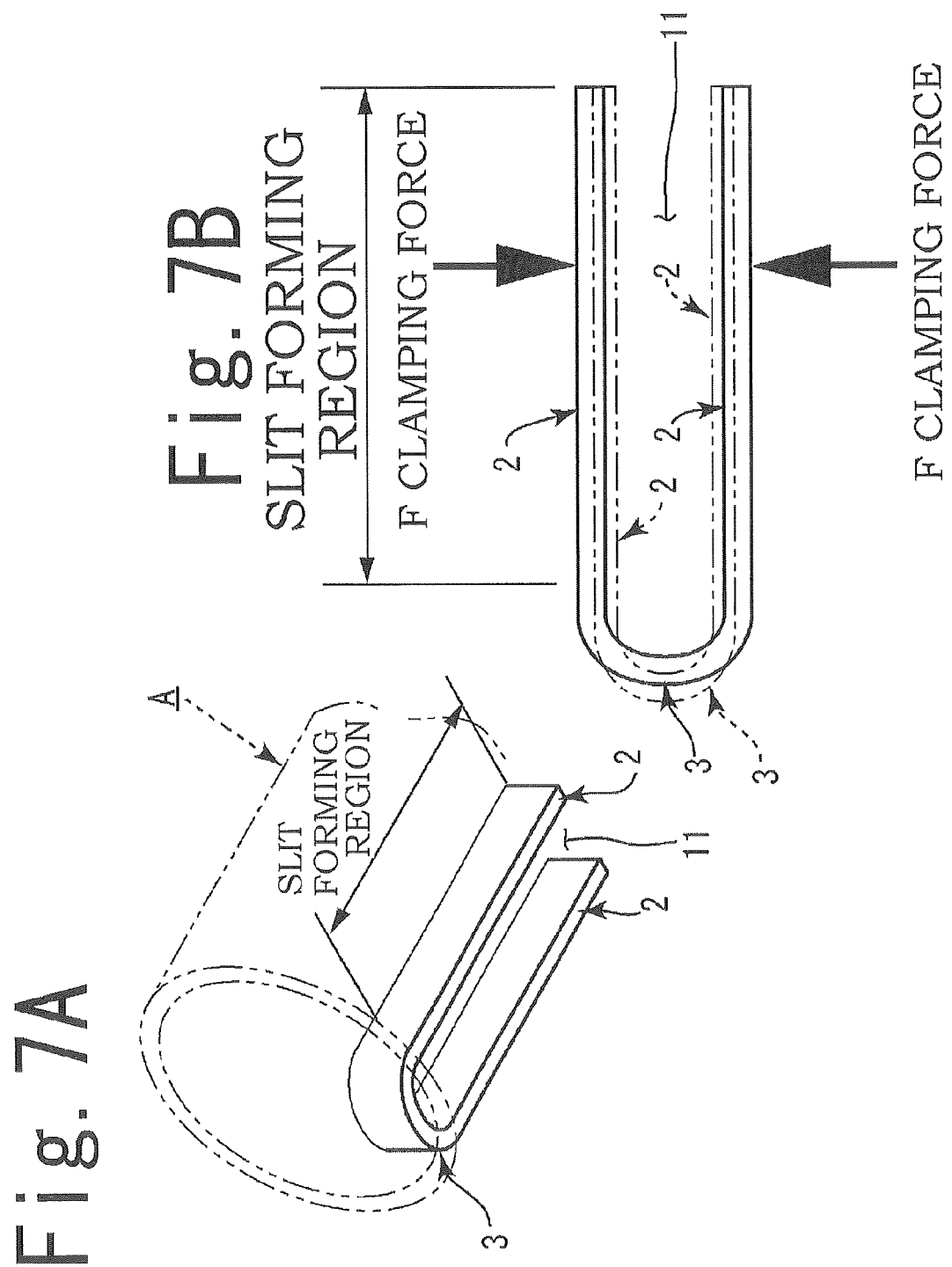

STEERING DEVICE

BACKGROUND OF THE INVENTION

1. Field of the Invention

The present invention relates to a steering device including a tilt/telescopic adjustment function, in which clamping and unclamping of an inner pipe to which a steering shaft is attached can be reliably performed.

2. Description of the Related Art

In general, a tilt/telescopic adjustment function is provided in a steering device for an automobile. One general structure of a steering device of this kind is provided in the steering device previously developed by the applicants and proposed in Japanese Patent Application Publication No. 2010-254290. This has a structure including a fixing bracket which is attached to the vehicle body, an inner pipe which rotatably supports a steering shaft, an outer column which supports the inner pipe slidably in the axial direction, and clamping means for clamping the inner pipe by the outer column.

In Japanese Patent Application Publication No. 2010-254290, a slit-shaped separating portion is formed along the axial direction in a gripping main body portion of the outer column. The inner pipe is gripped on the inner peripheral side of the gripping main body portion, and two clamping portions formed at the location of the separating portion of the outer column are able to narrow the interval of the separating portion by means of a clamping tool. In this way, the inner pipe is clamped by the gripping main body portion, and can be locked during tilt/telescopic adjustment.

SUMMARY OF THE INVENTION

FIGS. 8A and 8B are schematic drawings showing the main composition of an outer column in the prior art such as Japanese Patent Application Publication No. 2010-254290. In Japanese Patent Application Publication No. 2010-254290, the separating portion is formed from the front side to the rear side of the gripping main body portion. A peripheral supporting portion in which the inner wall surface continues along the peripheral direction is present at the front side end of the gripping main body portion in the axial direction (see FIG. 8A).

In the forming region of the separating region, the peripheral supporting portion is a continuous portion in the form of a bridge between the respective edges in the width direction. By means of this peripheral supporting portion, the separating portion of the gripping main body portion is reinforced in the peripheral direction.

However, when the interval between the two ends of the separating portion is enlarged or contracted in the width direction by the clamping tool and the two clamping portions, then the peripheral supporting portion forms a resisting member and the separating portion cannot be enlarged at the forming location of the peripheral supporting portion. Therefore, if the two clamping portions are clamped by the clamping tool, then as shown by the illustration of the prior art shown in FIG. 8B, the separating portion is narrowed on the opposite side of the circumferential supporting portion in the axial direction, becomes less liable to narrow the further the position towards the side of the circumferential supporting portion, and does not narrow at all in the location where the circumferential supporting portion is formed.

Therefore, a differential occurs in the holding force between the side close to the peripheral supporting portion and the opposite side in the axial direction, due to the contact between the inner peripheral side of the gripping main body portion and the outer peripheral side of the inner pipe, and there may be cases where the clamping force is sacrificed, albeit slightly, and hence there is still scope for improvement in this respect.

Therefore, the object (technical problem) of the present invention is to enable an even smoother clamping operation of the inner pipe by the clamping tool, in an outer column of a steering device provided with a tilt/telescopic adjustment mechanism, as well as further improving the clamping state of the outer column to the inner pipe.

Therefore, in order to resolve the abovementioned problem, the present inventors, as a result of painstaking research, resolved the problem described above by forming a first embodiment of the present invention as a steering device, including: a fixing bracket; an outer column including a gripping main body portion which is installed swingably on the fixing bracket and which grips an inner pipe, a slit portion formed along the gripping main body portion, clamping portions formed along an axial direction of slit edges which are mutually opposing in a width direction of the slit portion, and a coupling portion which couples together the two clamping portions; and a clamping tool which expands and contracts an interval between the two coupling portions of the outer column, wherein the coupling portion projects to the outer side of a forming region of the slit portion.

The abovementioned problem was resolved by forming a second embodiment of the present invention as the steering device of the first embodiment, wherein the coupling portion is formed to extend along the axial direction of the slit portion. The abovementioned problem was resolved by forming a third embodiment of the present invention as the steering device of the first or second embodiment, wherein a space portion is formed with respect to the gripping main body portion, above the coupling portion.

The abovementioned problem was resolved by forming a fourth embodiment of the present invention as a steering device, including: a fixing bracket; an outer column including a gripping main body portion which is installed swingably on the fixing bracket and which grips an inner pipe, a slit portion formed along the gripping main body portion, clamping portions formed along an axial direction of slit edges which are mutually opposing in a width direction of the slit portion, and a coupling portion which couples together the two clamping portions; and a clamping tool which expands and contracts an interval between the two coupling portions of the outer column, wherein the coupling portion of the outer column is formed to project downwards to the outer side of a forming region of the slit portion. The abovementioned problem was resolving by forming a fifth embodiment of the present invention as the steering device according to the first or fourth embodiment, wherein the coupling portion is formed in a circular arc shape.

In the present invention, the two clamping portions are formed along the axial direction of the slit edges which are mutually opposing in the width direction of the slit portion. The clamping portions are coupled by a coupling portion, and the coupling portion projects to the outer side in the axial direction of the forming region of the slit portion.

By adopting a composition of this kind, when the clamping portions are clamped by a clamping tool, the load produced by this clamping is transmitted to the clamping portions and the coupling portion, but since the coupling portion, in particular, is positioned to the outside of the forming region of the slit portion, then the clamping load is readily concentrated in the coupling portion. Therefore, deformation occurs principally in the coupling portion, the coupling portion does not form a resistance that impedes the clamping by the clamping tool, and the clamping portions can be made to approach each other smoothly.

Therefore, even on the side of the slit portion where the coupling portion is formed, the slit can be narrowed readily, and the contact between the inner peripheral side surface of the gripping main body portion and the outer peripheral side surface of the inner pipe produces a substantially uniform holding force and hence a reliable satisfactory holding force can be obtained. Furthermore, when releasing the lock, the two slit edges of the slit portion open readily throughout their entirety in the axial direction, the slidability of the inner pipe with respect to the outer column is good, the operating load during telescopic adjustment is restricted, and easy operability can be achieved. Furthermore, since a structure is adopted in which one end side of the slit portion is closed by the coupling portion, then the rigidity of the outer column is not reduced and a durable composition can be achieved.

BRIEF DESCRIPTION OF THE DRAWINGS

FIG. 2A is a cross-sectional view along arrow Y1-Y1 in FIG. 1A, and FIG. 2B is a cross-sectional view along arrow Y2-Y2 in FIG. 1A;

FIG. 3A is a perspective diagram of an outer column, and FIG. 3B is a view along arrow Y3-Y3 in FIG. 3A;

FIG. 5A is a plan diagram showing an under view of an embodiment adopting a second type of a coupling portion, FIG. 5B is a plan diagram showing an under view of an embodiment adopting a third type of a coupling portion, and FIG. 5C s a plan diagram showing an under view of an embodiment adopting a fourth type of a coupling portion;

FIG. 6A is a longitudinal cross-sectional diagram of an outer column in a second embodiment of the present invention, and FIG. 6B is a cross-sectional diagram along arrow Y4-Y4 in FIG. 6A;

FIG. 7A is a perspective diagram showing the composition of clamping portions and a coupling portion of an outer column according to the present invention, and FIG. 7B is a plan diagram showing a composition of clamping portions and a coupling portion of an outer column according to the present invention.

DESCRIPTION OF THE PREFERRED EMBODIMENTS

Figure 1A:
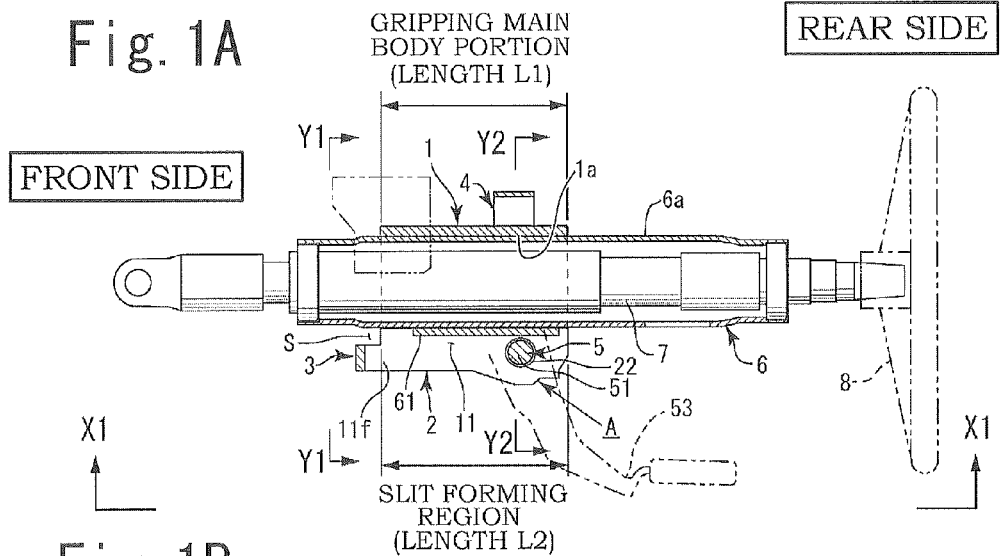
FIG. 1A is a longitudinal cross-sectional diagram of a first embodiment of the present invention.
Figure 1B:
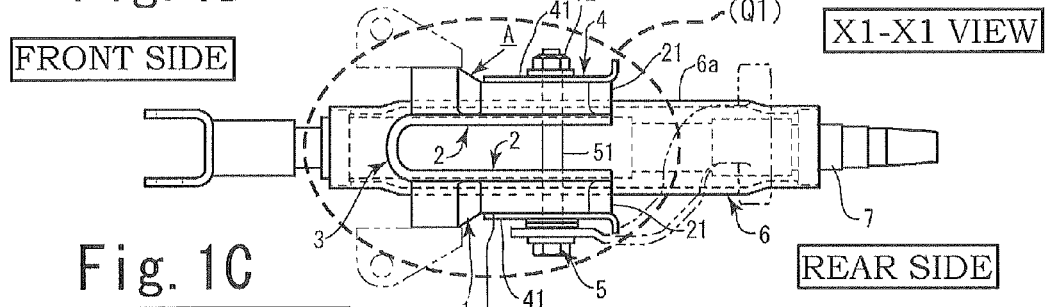
FIG. 1B is a view along arrow X1-X1 in FIG. 1A.

The present invention includes a first and a second embodiments, and the first embodiment will be described first. As shown in FIG. 1 and FIG. 2, the main components of the steering device are an outer column A, a fixing bracket 4, a clamping tool 5 and an inner pipe 6.

Here, there are statements referring to directions in the present invention, which mention the front side and the rear side. This front side and rear side refer to the front/rear direction of the automobile in a state where the steering device is installed in an automobile. More specifically, in the respective constituent members of the steering device, the side towards the front wheels of the automobile is taken to be the front side and the side towards the steering wheel 8 is taken to be the rear side.

The outer column A is constituted by a gripping main body portion 1, a clamping portion 2 and a coupling portion 3. As shown in FIG. 3, the gripping main body portion 1 is formed in a substantially round tubular shape having a hollow interior, and specifically the interior has a gripping inner peripheral side surface portion 1a formed in a hollow shape. A slit portion 11 is formed on the lower side of the gripping main body portion 1 in the radial direction (see FIG. 1 and FIG. 3).

The slit portion 11 is a portion which is separated so as to be non-continuous in the width direction, from the front side towards the rear side of the axial direction of the gripping main body portion 1 (see FIG. 1 and FIG. 3). In the first embodiment (or the second embodiment) of the present invention, the length L2 of the forming region of the axial-direction slit portion 11 is the same as the axial-direction length L1 of the gripping main body portion 1.

Moreover, there is also an embodiment in which the slit portion 11 is not formed through the whole of the gripping main body portion 1, but rather there is a partial continuous portion. In other words, there may also be cases where the length L2 of the forming region of the axial-direction slit portion 11 is smaller than the axial-direction length L1 of the gripping main body portion 1 (see FIG. 6A). The edge portions of the slit portion 11 which are mutually opposing on either side in the width direction are called slit edges 11a. The two slit edges 11a each have a straight line shape and are parallel.

By means of the two slit edges 11a approaching each other, the diameter of the gripping inner peripheral side surface portion 1a becomes smaller, and the inner pipe 6 which has been accommodated and installed inside the gripping main body portion 1 can thereby be clamped and locked (fixed). A coupling portion 3 (described below) is provided to the outer side of the forming section of the slit portion 11, to the front side or rear side thereof.

The gripping inner peripheral side surface portion 1a of the gripping main body portion 1 is formed so as to become slightly larger than the outer diameter of the inner pipe 6, when in an unlocked state, in such a manner that the inner pipe 6 can slide easily. Furthermore, the gripping main body portion 1 is formed so as to be of a length enabling same to support a substantially intermediate portion of the axial direction of the inner pipe 6, suitably in the axial direction. The inner pipe 6 projects respectively from the front end portion and the rear end portion of the gripping main body portion 1 in the axial direction.

As shown in FIG. 1 and FIG. 3A, and so on, clamping portions 2, are formed in an integrated fashion below the outer column A. The respective clamping portions 2 have left/right symmetrical shapes, and are formed in an integrated fashion respectively at the positions of the two slit edges 11a of the slit portion 11, and more specifically, are plate pieces formed in a substantially vertical suspended fashion from the two slit edges 11a, or near same (see FIG. 3B).

Furthermore, the clamping portions 2 have a vertical plate shape on the front side in the axial direction of the gripping main body portion 1. Moreover, the clamping portions 2 have a block shape on the rear side of the axial direction of the clamping portions 2, and have a plate thickness that reaches to the positions of either end of the gripping main body portion 1 in the horizontal radial direction. Furthermore, the width direction dimensions of the clamping portions 2 on the rear side in the axial direction are formed to be slightly larger than the outer peripheral diameter of the gripping main body portion 1.

The plate thickness portions on the rear side of the axial direction of the two clamping portions 2 are called the connected portions 21. The outer surfaces of the two connected portions 21 are called the outer side surfaces 21a. The outer side surfaces 21a are flat surfaces, and in a state where the clamping portions 2 are gripped by the two fixed side portions 41 of the fixing bracket 4, it is possible to cause contact (including substantial contact) between the fixed side portions 41 and the outer side surfaces 21a of the connected portions 21. Clamping through holes 22 are formed in the two connected portions 21 along a direction which is perpendicular to the axial direction of the outer column A and which is parallel to the horizontal radial direction of the gripping main body portion 1.

Figure 1C:
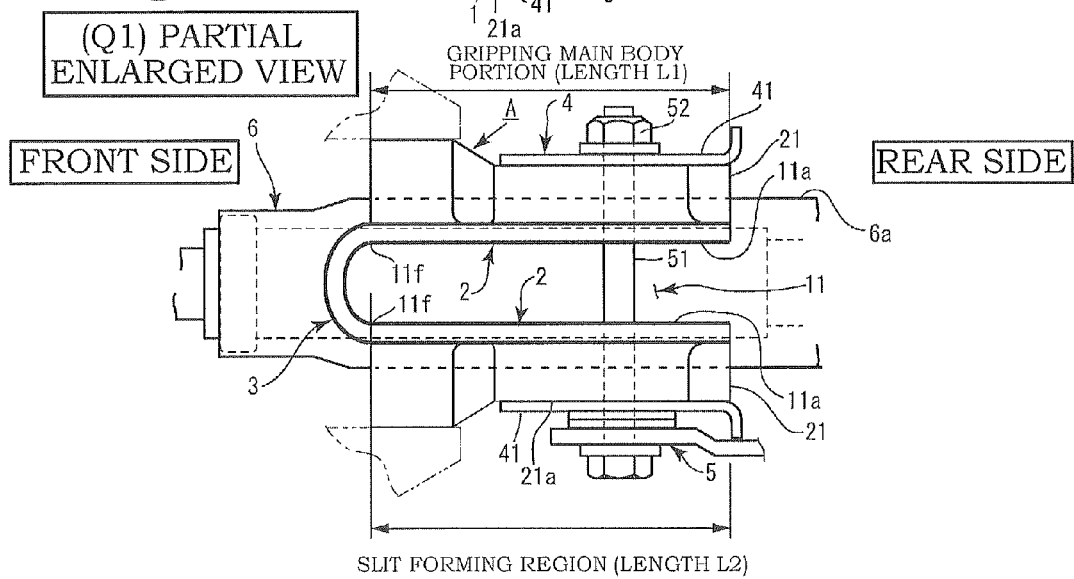
FIG. 1C is a partial enlarged diagram of part (Q1) in FIG. 1B.
Figure 4A:
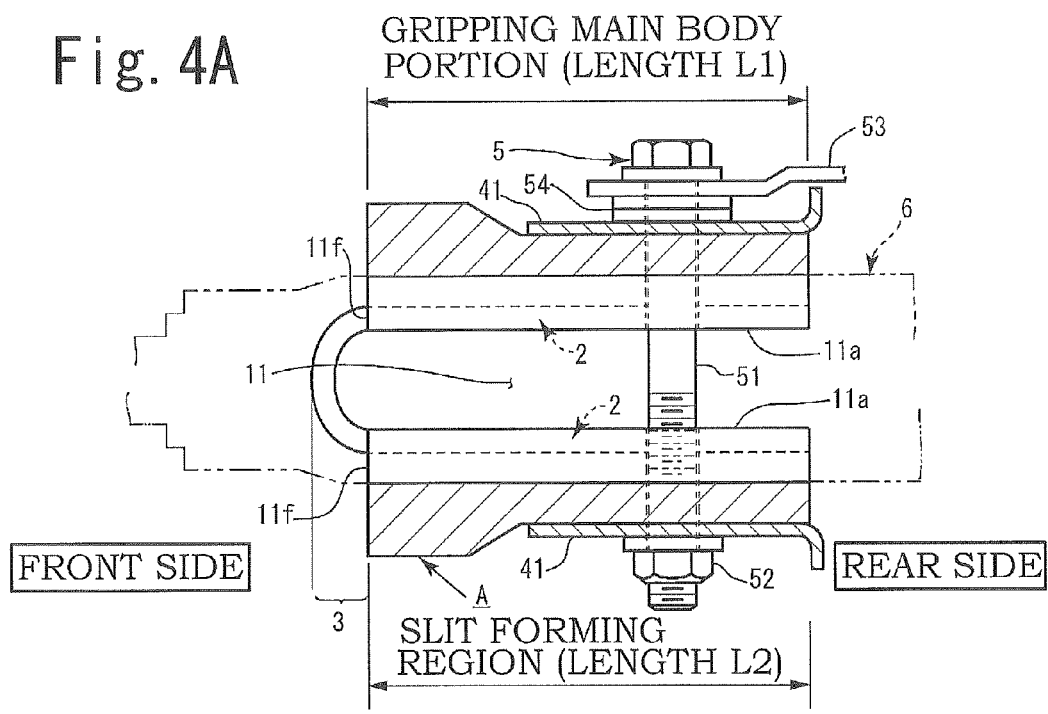
FIG. 4A is a lateral cross-section plan diagram of an outer column.
Figure 4B:
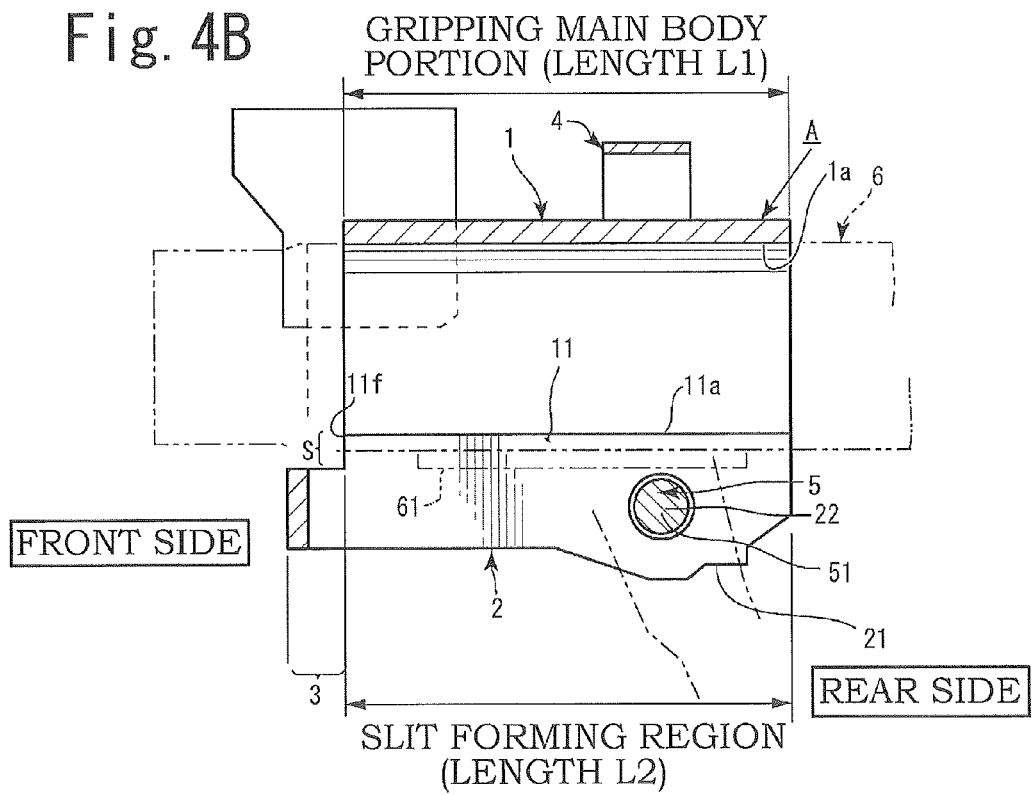
FIG. 4B is a vertical cross-section surface diagram of the outer column.
Figure 8B:
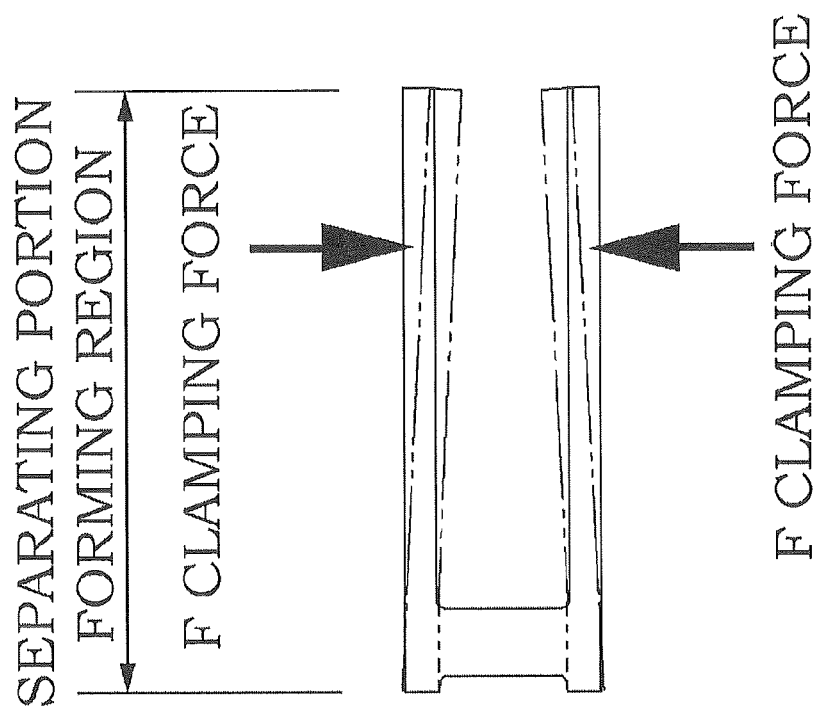
FIG. 8B is a plan diagram showing a composition of clamping portions and a coupling portion of an outer column according to the prior art.
Figure 8A:
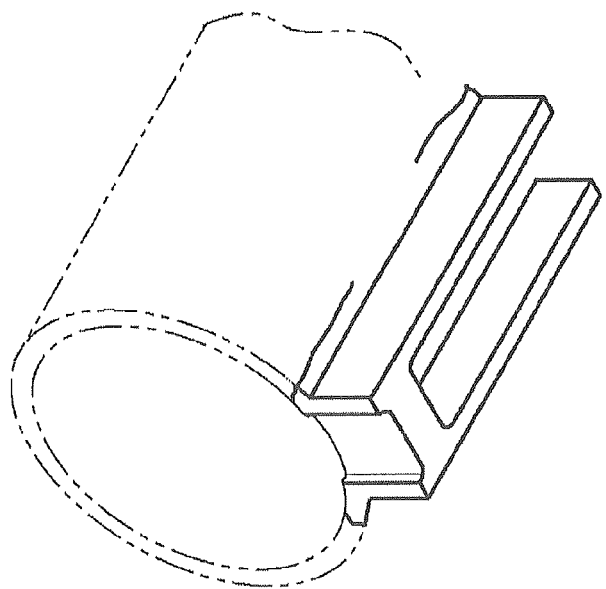
FIG. 8A is a perspective diagram showing a composition of clamping portions and a coupling portion of an outer column according to the prior art.

The coupling portion 3 is formed to project at a position separated towards the outer side from the axial direction front end 11f in the forming region of the slit portion 11 (see FIG. 1C, FIG. 3 and FIG. 4). Furthermore, the coupling portion 3 is formed to extend towards the front side or the rear side of the axial direction of the slit portion 11. Here, the outer side of the forming region of the slit portion 11 referred to above means the portion outside the range of the forming region of the slit portion 11, rather than the portion inside this range. Further, the outside of the range includes the front side or the rear side of the forming region of the slit portion 11, and also includes the up and down directions outside the forming region of the slit portion 11. Therefore, it can be considered that the coupling portion 3 is formed to project to the outer side at the front or the rear of the axial direction, from the range of the forming region of the two clamping portions 2.

Consequently, there is a space portion S in the up/down direction of the coupling portion 3, and there is no part near to, or in contact with, the coupling portion 3. In the embodiment of the present invention, a space portion S is provided above the coupling portion 3, between the coupling portion 3 and a portion of the gripping main body portion 1, or the inner pipe 6 which is supported by the gripping main body portion 1. In this way, the coupling portion 3 is formed outside the forming region of the slit portion 11 and is coupled on the outer side in the axial direction. In other words, the coupling portion 3 which couples the two slit edges 11a (or two clamping portions 2) of the slit portion 11 is not formed continuously along the circumferential direction in the gripping inner peripheral side surface portion 1a of the gripping main body portion 1.

As shown in FIG. 1 to FIG. 7, due to the coupling portion 3 being formed so as to project at a position separated to the front side in the axial direction from the forming region of the slit portion 11, when the two clamping portions 2 are clamped by the clamping tool 5, the loads F due to this clamping are transmitted to the coupling portion 3, and the coupling portion 3 deforms in a concentrated fashion. This deformed state involves, for example, deformation in a compressed state along the axial direction (see FIG. 7B).

Therefore, the two clamping portions 2 approach each other throughout their entirety in the axial direction, on the side close to the coupling portion 3 and on the opposite side, while simultaneously, the two slit edges 11a of the slit portion 11 can approach each other throughout their entirety in the axial direction. Furthermore, when the clamping by the clamping tool 5 is released, the two clamping portions 2, and the two slit edges 11a of the slit portion 11 can be separated from each other, throughout their entirety in the axial direction, by the restoring force of the coupling portion 3 (see FIG. 7B).

Consequently, the contact between the gripping inner peripheral side surface portion 1a of the gripping main body portion 1, and the outer peripheral side surface 6a of the inner pipe 6 produces a substantially uniform holding force, and therefore good and reliable holding can be achieved. Furthermore, when releasing the lock, the two slit edges 11a of the slit portion 11 are released readily throughout their entirety in the axial direction, and the slidability of the inner pipe 6 with respect to the outer column A is good. Therefore, the operational load when performing telescopic adjustment can be restricted, and easy operability can be achieved. Moreover, while adopting a configuration of this kind, a durable composition can be achieved without reducing the rigidity of the outer column A.

A variety of types of coupling portion 3 are possible, depending on the shape thereof, and a first type is one having a circular arc shape (see FIG. 1, FIG. 3A and FIG. 4A, etc.). In this first type, when the slit portion 11 is expanded or contacted in the width direction by a locking and unlocking operation of the clamping tool 5, the load produced by the clamping of the two clamping portions 2 due to the clamping tool 5 is applied to the circular arc-shaped coupling portion 3.

In the circular arc-shaped coupling portion 3, the load is dispersed uniformly, and consequently, deformation can be concentrated substantially in the coupling portion 3, without giving rise to deformation and distortion in the two clamping portions 2. Therefore, the two clamping portions 2, can expand and contract while readily maintaining a parallel state, and good locking and unlocking can be performed.

Furthermore, a second type of coupling portion 3 is one having a substantially U-shaped form (see FIG. 5A). In this second type, the coupling portion 3 is composed by a bent plate-shaped circular arc portion 31 and flat plate portions 32, and the flat plate portions 32 are formed in a continuous fashion at either end of the circular arc portion 31, and the two flat plate portions 32 are formed continuously with the two clamping portions 2.

In this second type, the coupling portion 3 can be composed so as to project yet further to the outer side from the front end of the slit portion 11 in the axial direction, and when the two clamping portions 2 are clamped by the clamping tool 5 without any resistance due to expansion and contraction, the two slit edges 11a of the slit portion 11 can expand and contract yet further throughout their entirety in the axial direction.

Next, a third type of a coupling portion 3 has a substantially V-shaped form (see FIG. 5B). In this third type, when in a locked state, the load due to clamping can be concentrated in the fold-back portion 33 of the V-shaped form of the coupling portion 3, and therefore deformation or distortion of the two clamping portions 2 is not liable to occur, and consequently the durability of the outer column A can be improved.

Next, a fourth type of a coupling portion 3 has a capital omega (Ω)-shaped form (see FIG. 5C). In this fourth type, the coupling portion 3 has a circular portion 34 which is even closer to a circular shape, and the flat plate portions 32 are formed on either end of the circular portion 34. In this fourth type, the Ω-shaped coupling portion 3 is most liable to deform due to the load produced by clamping, and therefore absorbs the load yet further, and deformation and distortion of the two clamping portions 2 can be made less liable to occur.

Consequently, expansion and contraction of the two slit edges 11a can be achieved throughout their entirety in the axial direction, and locking and unlocking of the inner pipe 6 with respect to the outer column A can be achieved. Although not shown specifically in the drawings, the coupling portion 3 can also be formed on the outer side and the rear side in the axial direction of the forming region of the slit portion 11.

Next, a fixing bracket 4 is composed by fixed side portions 41 which are formed on both sides in the width direction and an attachment top portion 42. Adjustment holes 43 which are elongated holes in substantially the vertical direction or the longitudinal direction are formed in the two fixed side portions 41 (see FIG. 2B). The attachment top portion 42 is installed via a capsule member at a prescribed position inside the vehicle, and is capable of absorbing impact energy in the event of an impact.

An intermediate portion of the steering shaft 7 is fitted internally inside the inner pipe 6, and a steering wheel 8 is installed on a front end of the portion of the steering shaft projecting on the rear side thereof from the inner pipe 6. Furthermore, a rotation stopping member 61 is fixed to a lower portion of the radial direction of the steering shaft 7, and the rotation stopping member 61 is installed so as to be accommodated inside the slit portion 11 (see FIG. 2).

Next, the installation of the main constituent members of the present invention will be described. The two clamping portions 2, of the outer column A are gripped between the two fixed side portions 41 of the fixing bracket 4, a bolt 51 of the clamping tool 5 is passed through the adjustment holes 43 of the fixed side portions 41 and the clamping through holes 22 which are formed in the clamping portions 2, and is installed by a nut 52, together with a lock lever part 53 and a clamping cam 54. The thickness of the clamping cam 54 changes in the axial direction of the bolt 51, due to a rotating operation of the lock lever part 53.

Due to the rotating operation of the lock lever part 53, a load caused by the clamping of the whole clamping tool 5 is generated, and the two fixed side portions 41 of the fixing bracket 4 are pressed so as to narrow the interval therebetween. The clamping portions 2 are pressed by the two fixed side portions 41, and both are clamped by the clamping tool 5.

Consequently, the interval of the slit portion 11 of the gripping main body portion 1 of the outer column A is narrowed, and the inner pipe 6 installed on the outer column A is locked (fixed) in the axial direction. In this case, the gripping inner peripheral side surface portion 1a of the outer column A and the outer peripheral side surface of the inner pipe 6 are in a state of contact, and by raising the frictional force with respect to the inner pipe 6, the inner pipe is fixed in the axial direction.

Moreover, when the clamping of the clamping tool 5 is released, the interval between the two fixed side portions 41 is opened, and the interval between the two clamping portions 2, also opens simultaneously, the locking of the inner pipe 6 of the outer column A gradually becomes weaker, the inner pipe 6 performs movement in the axial direction, and therefore telescopic adjustment becomes possible, while simultaneously with this, the outer column A can perform a tilt adjustment by moving upwards and downwards together with the bolt 51 of the clamping tool 5, with respect to the adjustment holes 43 of the two fixed side portions 41 of the fixing bracket 4.

Furthermore, in the present invention, the slit edges 11a of the slit portion 11 and the clamping portions 2 can be caused to approach each other through their entirety in the axial direction. Consequently, it is possible to further stabilize the fixing of the outer column A with respect to the inner pipe 6, and the load produced by this clamping can be strengthened yet further.

Moreover, since the coupling portion 3 which couples the two clamping portions 2 at the location of the front end portion of the clamping portions 2 in the axial direction is formed to the outside of the forming region of the slit portion 11 in the axial direction, then the supporting rigidity of the inner pipe 6 by the outer column A is increased, and the operational sensitivity of the steering wheel can be improved.

Furthermore, in the second embodiment of the present invention, the coupling portion 3 is formed so as to project downwards to the outer side of the forming region of the slit portion 11. In this second embodiment, a composition is adopted in which two clamping portions 2, are coupled by the coupling portion 3 on the front side of the clamping portions 2 in the axial direction. The coupling portion 3 is formed to project downwards to the outer side of the forming region of the slit portion 11.

Similarly to a case where the coupling portion 3 is formed at a position extending on the front side of the slit portion 11 in the axial direction, when clamping is performed by the clamping tool 5, the two clamping portions 2 can be caused to approach each other smoothly throughout their entirety in the axial direction, without the coupling portion 3 forming a resisting member which impedes the clamping operation. Furthermore, when the clamping by the clamping tool 5 is released, the two clamping portions 2 can be separated smoothly throughout their entirety in the axial direction, by the restoring force of the coupling portion 3. Moreover, since the slit portion 11 is coupled by the coupling portion 3, it is possible to achieve a durable composition, without any reduction of the rigidity of the outer column A.

Furthermore, in the second embodiment, the slit portion 11 is formed below the gripping main body portion 1, but the slit portion 11 may also be formed so as to project in an upward direction. Moreover, the coupling portion 3 may also be formed to project to the rear side of the axial direction in the forming region of the slit portion 11. The present invention can be changed and modified, as appropriate, with respect to the embodiment described above.

In the second embodiment, the coupling portion is formed so as to extend along the axial direction of the slit portions, thereby achieving a composition in which the two clamping portions formed along the slit edges and the coupling portion are aligned substantially in the axial direction. Consequently, shape distortion, such as twisting in the up/down directions, becomes less liable to occur when the interval between the two clamping portions is narrowed by the clamping tool, and therefore the interval between the clamping portions can be expanded and contracted smoothly by means of a relatively small force.

In the third embodiment, a space portion is formed with respect to the gripping main body portion, in the up/down direction of the coupling portion which is formed to the outer side of the forming region of the slit portion. The coupling portion is formed without making contact with the gripping main body portion, and therefore when clamping by the clamping tool, it is possible to make the two clamping portions approach each other smoothly without the coupling portion itself forming a resisting member which impedes the clamping action, and the inner pipe can be held reliably.

In the fourth embodiment, the coupling portion of the outer column is formed to project downwards to the outer side of the forming region of the slit portion, and hence the two clamping portions can be made to approach each other smoothly, without the coupling portion forming a resisting member when clamping by the clamping tool, and the gripping main body portion can hold the inner pipe reliably.

In the fifth embodiment, since the coupling portion is formed in a circular arc shape, then when the slit portion is expanded or contracted by a locking or unlocking operation by the clamping tool, the load produced by the clamping of the two clamping portions due to the clamping tool is applied to the coupling portion which has a circular arc shape, and the load is dispersed uniformly. Accordingly, the coupling portion deforms, without the occurrence of deformation and distortion in the two clamping portions, and the slit portion can be expanded and contracted via the two clamping portions, and locking and unlocking are performed in a satisfactory manner.

What is claimed is:

1. A steering device, comprising:
   a fixing bracket;
   an outer column including a gripping main body portion which is installed swingably on the fixing bracket and which grips an inner pipe, a slit portion formed along the gripping main body portion, clamping portions formed along an axial direction of slit edges which are mutually opposing in a width direction of the slit portion, and a coupling portion which couples together the two clamping portions; and
   a clamping tool which expands and contracts an interval between the two clamping portions of the outer column,
   wherein the coupling portion projects to the outer side of a forming region of the slit portion,
   wherein a space portion is formed with respect to the gripping main body portion, above the coupling portion.

2. A steering device, comprising:
   a fixing bracket;
   an outer column including a gripping main body portion which is installed swingably on the fixing bracket and which grips an inner pipe, a slit portion formed along the gripping main body portion, clamping portions formed along an axial direction of slit edges which are mutually opposing in a width direction of the slit portion, and a coupling portion which couples together the two clamping portions; and
   a clamping tool which expands and contracts an interval between the two clamping portions of the outer column,
   wherein the coupling portion projects to the outer side of a forming region of the slit portion,
   wherein the coupling portion is formed to extend along the axial direction of the slit portion, and
   wherein a space portion is formed with respect to the gripping main body portion, above the coupling portion.

* * * * *